April 8, 1952　　　　S. M. MILLER　　　　2,591,960
AIRCRAFT GUN MOUNT
Filed April 4, 1945　　　　　　　　　　　　　　3 Sheets-Sheet 1
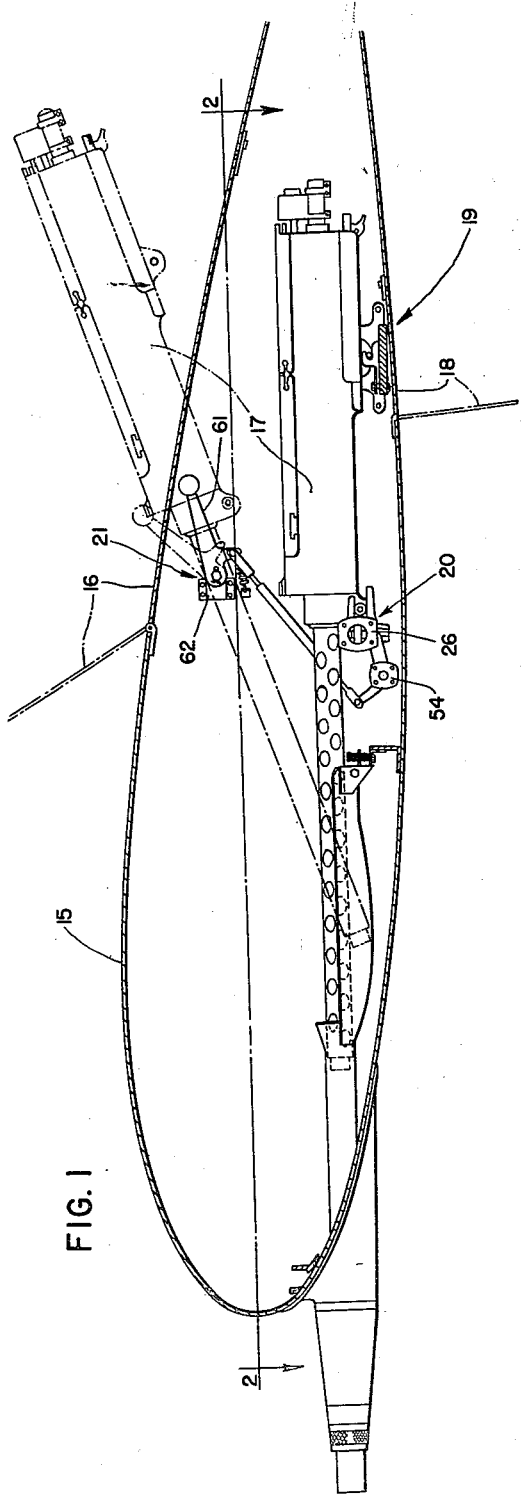
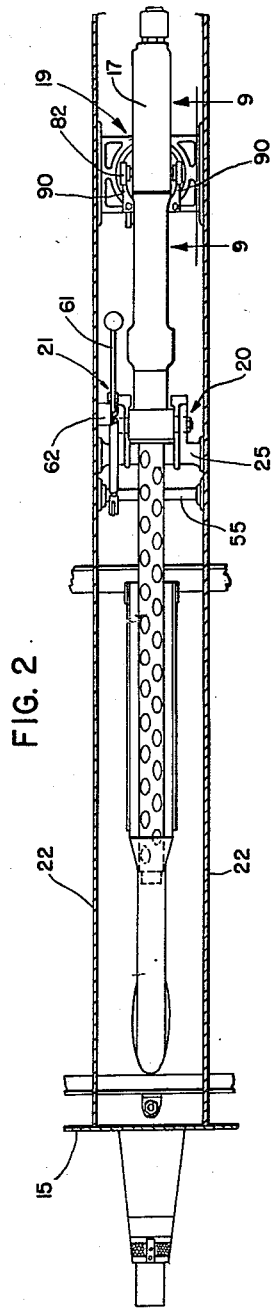
INVENTOR.
SHELDON M. MILLER
BY George F. Goodyear
ATTORNEY April 8, 1952     S. M. MILLER     2,591,960
AIRCRAFT GUN MOUNT
Filed April 4, 1945     3 Sheets-Sheet 2
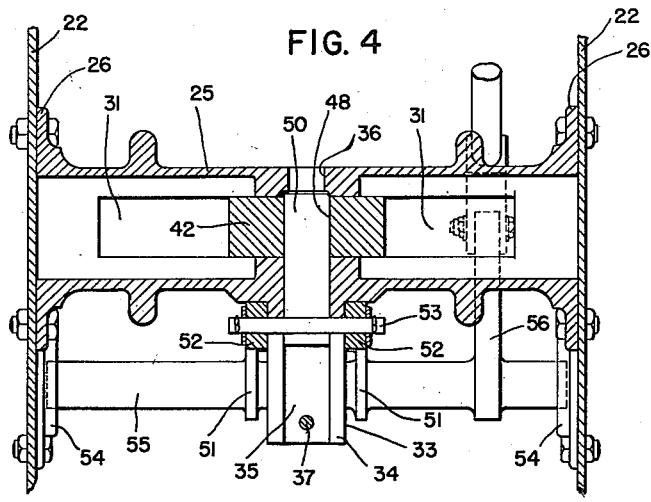
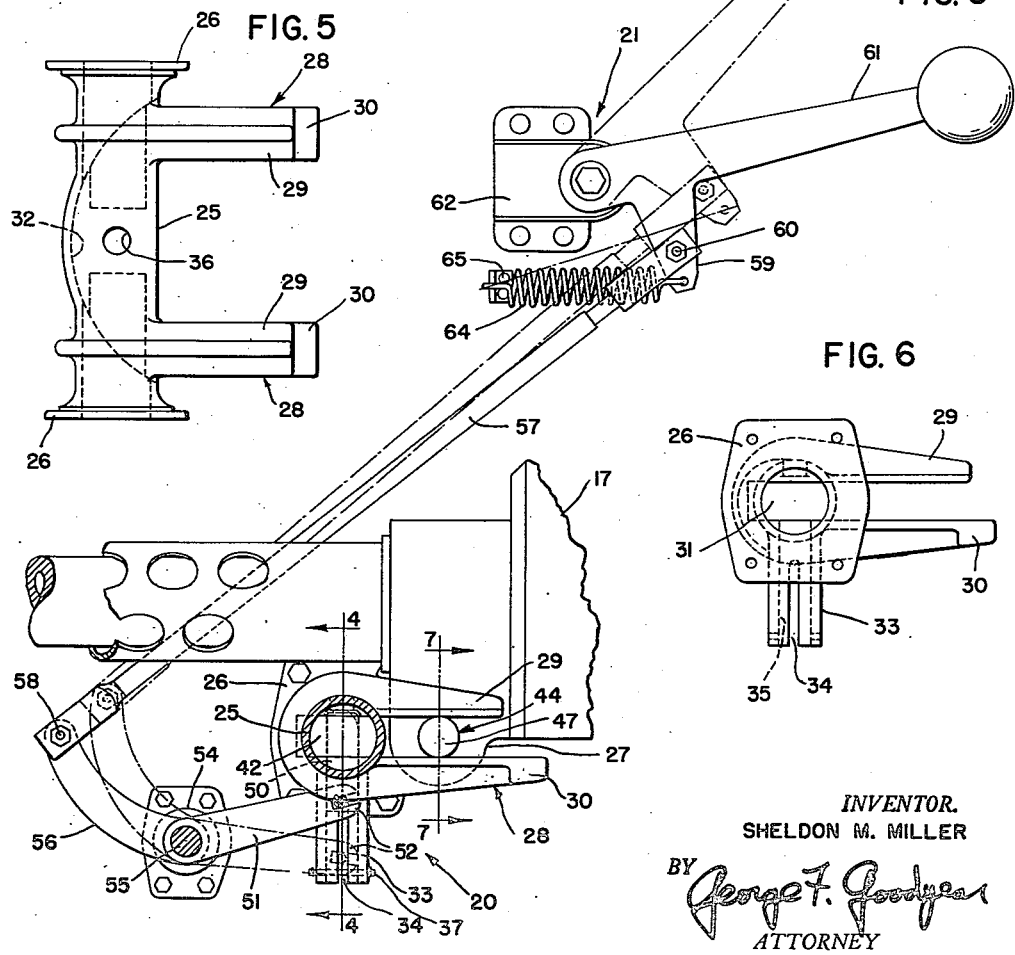
INVENTOR.
SHELDON M. MILLER
BY George F. Goodyear
ATTORNEY April 8, 1952    S. M. MILLER    2,591,960
AIRCRAFT GUN MOUNT
Filed April 4, 1945    3 Sheets-Sheet 3
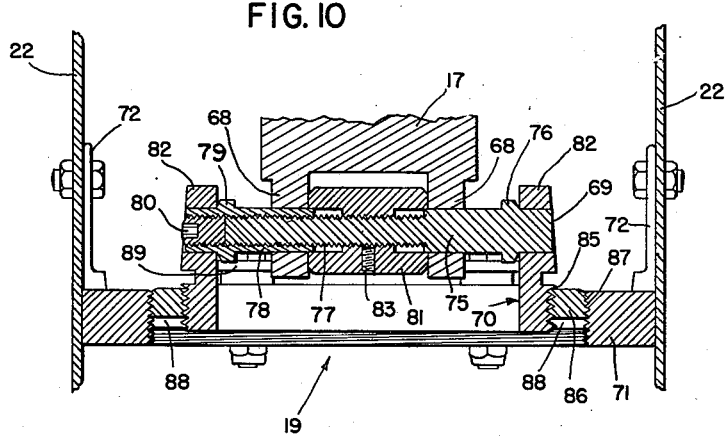
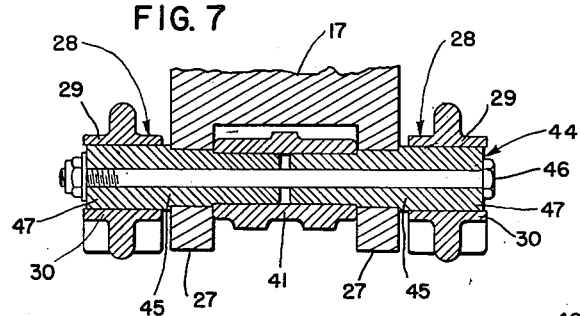
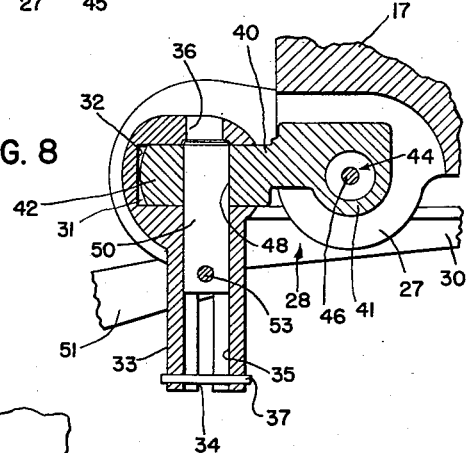
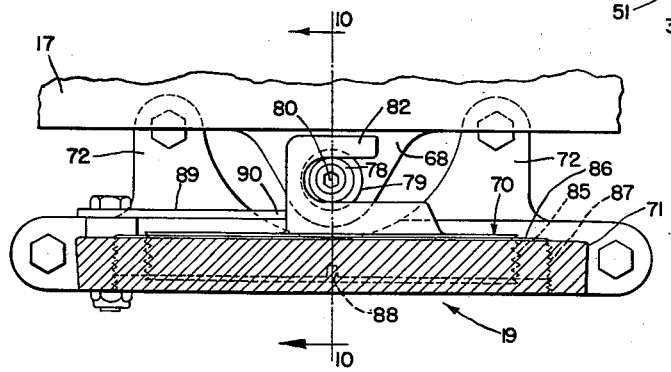
*INVENTOR.*
SHELDON M. MILLER
BY *George F. Goodyear*
*ATTORNEY*

Patented Apr. 8, 1952

2,591,960

UNITED STATES PATENT OFFICE 2,591,960

AIRCRAFT GUN MOUNT

Sheldon M. Miller, Lakewood, Ohio, assignor to Curtiss-Wright Corporation, a corporation of Delaware Application April 4, 1945, Serial No. 586,507

3 Claims. (Cl. 89—37.5)

This invention is directed to ordnance installations in general and more particularly to certain improvements in mounting means for guns.

One of the objects of the present invention resides in the improvement for rendering the gun mounting means more easily and quickly adjustable whereby training or aligning operations may be facilitated.

A second and equally important object hereof is to be found in the further improvement of arranging the adjustable mount means for quick detachment.

Another object resides in the novel and improved means and mechanism for effecting quick release and removal of an ordnance piece.

A further object is to be found in the arrangement of the present invention adapting the same for advantageous use in connection with the mounting and training of ordnance pieces for aircraft installations.

Still other objects and advantages will be pointed out during the course of the detailed description of a preferred arrangement illustrated in the drawing, in which:

Figure 1 is a partial sectional elevational view of the invention as applied to a gun installation for aircraft, Figure 2 is a top plan view of the installation of Figure 1 as seen along the line 2—2 thereof, Figure 3 is a greatly enlarged fragmentary elevational detail of the forward mount and release mechanism therefor, Figure 4 is a further sectional detail as viewed at line 4—4 in Figure 3, Figure 5 is a plan view of the fixed bracket member of the forward gun mount, Figure 6 is an end elevation of the fixed bracket member, Figure 7 is a fragmentary sectional elevational detail at line 7—7 in Figure 3, Figure 8 is an enlarged sectional detail through the forward mounting means as the same is seen in Figure 3 in assembly, Figure 9 is an enlarged but fragmentary sectional elevation of the rear gun mount as viewed at line 9—9 of Figure 2, and Figure 10 is a sectional detail of the same as taken at line 10—10 of Figure 9.

The present invention is concerned with the mounting provisions for an aircraft gun installation, but certain other features of the installation disclosed here have been more specifically referred to in a copending application for patent filed in the name of Donald E. Kuska on April 4, 1945, bearing Serial No. 586,541, and patented as U. S. Patent No. 2,444,300.

With reference to Figures 1 and 2 this invention is particularly disclosed as including an airfoil body 15 having a large access door 16 hingedly mounted in its upper surface for permitting the passage therethrough of a machine gun or ordnance piece 17, and a second door 18 in its lower surface to provide easy access to an adjustable rear gun mount and training or aligning mechanism 19. The gun 17 is also secured at a more forward location by a second and locking type mount 20 for which a suitable lock release or lever mechanism 21 has been arranged. The installation is illustrated as being limited to a narrow compartment of the airfoil body as defined by spaced rib or bulkhead members 22. The forward and rearward mounting means as well as the release mechanism is carried by and between these rib members 22 as is indicated generally in Figure 2.

The phantom outline of the gun 17 in Figure 1 is intended to illustrate the manner of manipulating the same for removal or installation purposes. Certain other aspects of this arrangement have been explained in great detail in connection with the above referred to copending application of Donald E. Kuska.

The forward mounting means for the gun installation is shown in general in Figures 1 through 3 and in greater detail in Figures 4 through 8. In particular, the mount comprises a generally tubular body member 25 formed with end flanges 26 by which the same is suitably secured or bolted to the rib members 22 in the vicinity of a pair of spaced and depending lugs or ears 27 formed as an integral part of the gun 17. The member 25 is further provided with a pair of spaced and rearwardly projecting fixed jaw means 28 which assume spaced positions to embrace the gun lugs 27 (Figure 7). Each of these jaws 28 has an upper element 29 and a lower element 30 which is somewhat longer in its rearwardly projecting extent. The space between these jaw elements is further extended within the body of the member 25 by the formation of a recess 31 (Figure 6) which, in plan view (Figure 5) is arcuate at the rear wall 32. In addition the fixed support member is provided with a depending tubular structure 33 which is slotted for a portion of its length as at 34. The bore 35 of the part 33 is axially concentric with a bore 36 in the main body portion of member 25 and somewhat larger in diameter (see Figure 4).

The means adapted to interconnect the gun 17 and support 25 just above described includes a pivot forming element 40 (Figure 8) having a rearward horizontally pivoted portion 41 disposed between the depending lugs 27 on the gun and a forward vertically pivoted portion 42 disposed in the slot 31 to be operably clear of the arcuate wall 32 thereof. A horizontal pivot means 44 is bearinged in the gun lugs and between the lugs 27 as seen in Figure 7. In this latter view the pivot 44 is constituted by a pair of tubular pin elements 45 journalled in the lugs and carrying the member 41 on and between their inner ends. A through bolt 46 holds this pivot in assembly on the gun. Cylindrical projections or trunnions 47 extend to either side of the gun and lie between the jaw elements whereby to facilitate mounting and demounting manipulation of the gun with respect thereto, these comprising a forward pair of trunnions.

The portion 42 of the pivot forming element 40 is slidably inserted in the slot 31 so that an aperture 48 therein registers with the bores 35 and 36 in member 25, whereupon a locking type pivot pin 50 may be inserted. The pin prevents separation of gun and support so long as it engages the element 40. This pin is slidably mounted in bore 35 of the depending means 33 and is actuated or reciprocated therein by a fork member 51, the bifurcated ends 52 of which engage the extremities of a cross pin 53 which passes through the locking pin 50 and projects outwardly at either side of the slots 34 (see Figures 3 and 4).

When the locking pin 50 is in the up position indicated in Figure 3 the forward gun mount is locked in its operative position. In this case the gun is provided with a pair of pivoting axes which permit vertical as well as horizontal training movement thereof. The horizontal pivot plane is established and constituted by the vertical pin 50 in combination with the element 40, and the vertical pivot plane is defined in part by the horizontal pin 44. The effect of the two pivots is to give the gun full and unrestricted movement in two principal planes or movement which is a component of these principal planes.

The system 21 by which the locking pin 50 may be reciprocated in bore 35 is made up of the fork 51 constituted by spaced arms welded to or otherwise fixed on a countershaft 55 which is journalled in flanged elements 54 carried by and between the rib bulkheads 22. This shaft is rotated by a crank arm 56 and the crank is moved by a connecting link or rod 57 pivoted to crank 56, as at 58, and to the arm 59, as at 60, of a control lever 61. Control lever 61 is pivoted on a fixed bracket 62 and is constrained or biased to move in a clockwise direction about its pivot by a resilient element 64 which is anchored at 65 on the rib bulkhead and in the end of the arm 59 in the manner indicated in Figure 3. Thus the resilient element 64 will always act to retain the locking pin 50 in engagement with member 40 until the lever 61 is moved manually to the released position (phantom outline in Figure 3). Upon withdrawal of pin 50 into abutment with a stop element 37 in member 33, the gun 17 may be moved rearwardly until pin 44 has cleared the jaw element 29 and then lifted up and through the opening at door 11. The release of pin 50 cannot occur until the door 16 is open and lever 61 moved against the spring 64, as the lever is obstructed in its outward movement by the door when closed as indicated in Figure 1.

The rear gun mount and training means 19 is shown in detail in Figures 9 and 10 where suitable elements have been disclosed for training the gun 17 in horizontal and vertical planes with a minimum of effort. For example, the rear of the gun 17 is mounted by apertured lugs 68 on a horizontal training member 69 and the latter, in turn, is detachably mounted on a vertical training means or carrier member 70 which is supported on a fixed frame 71 secured to the bulkheads 22 by means of bolted flange elements 72.

The horizontal training means 69 includes a pin 75 having a bearing end defined by a flange 76 inward thereof and a threaded portion 77, an internally threaded sleeve 78 having a bearing end defined by a flange 79, and a set screw 80 threadedly received in the bearing end of the sleeve 78 for securing the parts in assembly. The means 69 is assembled on the lugs 68 with an adjusting thrust element 81 threadedly received on the pin 75 and held thereby between the lugs 68 in the manner clearly shown in Figure 10. The means 69 is adapted to have a detachable connection with the vertical training means 70 as by means of a pair of diametrally spaced and rearwardly opening hook or claw elements 82 integral with the latter means (Figure 10). The flanges 76 and 79 prevent lateral movement of the training means 69 and hence stabilize movement of the gun to that extent. This training means 69 is rendered effective for adjusting the position of the gun 17 about the pivot means 50 by holding either the thrust element 81 and rotating the means 69 or vice versa, whereupon the threading action thereof will move the gun in a horizontal plane and to either side of a centered position. A set screw 83 secures the member 69 and thrust element 81 against relative movement. The ends of the means 69 and 78, where they engage claws 82 comprise a rear pair of trunnions normally part of the gun assembly and, with the forward trunnions 47 enable easy removal and assembly of the gun in the aircraft-carried mounting means.

The vertical training mean or gun carrier 70 takes the form of a ring or collar element formed with the upstanding claws 82 for receiving the means 69 as indicated in Figures 9 and 10. In addition the collar is provided with exterior threads 85 which cooperate with mating threads on the interior surface of an adjusting ring 86, the latter being disposed between the collar and the fixed support 71 for threading engagement with the latter as at 87. Adjustment ring 86 is also formed with suitable radial slots 88 to receive a suitable spanner wrench used in effecting vertical adjustments of the collar. Since the support 71 is stationary it will be realized that rotation of ring 86 effects a vertical change of position of collar 70 provided the latter is held against rotation. Therefore, a stop plate 89 (Figures 2 and 9) is bolted to the support 71 and has a pair of spaced projections 90 which abut the rear faces of the upstanding claws 82. It is also preferred that the collar 70 move a greater distance than the ring 86 in order to achieve a desirable range of adjustment. Therefore, the threads 85 are more coarse or have a greater pitch than threads 87 and the collar means 70 is accordingly moved relative to the ring 86 while the latter moves with respect to the fixed support 71. The net effect of rotation of ring 86 is vertical change of position of the carrier means 70 with respect to the support 71. This adjustment is further characterized by the fact that threads 85 are of the opposite hand to the threads 87.

It should be clear now that the rear training means 19 is effective for securing proper horizontal and vertical sighting of the gun 17 while the forward pivotal mount organization 20 permits gun pivotal movement in either direction as required by adjustment at the rear mount.

Further, the gun 17 is also mounted in the claw elements 82 at the rear mount by the trunnions 69, 78 and in jaws 28 at the forward mount by the trunnions 47, these elements coacting to permit gun removal by rearward withdrawal only. In addition the forward mount is arranged to provide a lock system for preventing gun removal. Lock release action is obtained through a lever 61 which is movable only when the door 16 in the airfoil 10 is opened.

The present invention has been shown and described in connection with an aircraft structure such as a gun installed in the airfoil member or wing therefor, but it is readily understood that the invention may have other applications as will be defined by the appended claims.

What is claimed is:

1. In combination with a gun and support therefor, a first gun mount on said support and a first gun carried means engageable with said mount for support thereby, said means providing for tilting of the gun about a transverse horizontal axis, a second gun mount on said support spaced longitudinally from the first mount, a second gun carried means engageable with said second mount for support thereby, said first and second means being disengageable simultaneously from said mounts by and upon bodily linear movement of the gun in a longitudinal direction, means associated with the second means and second mount for adjusting the gun about said transverse horizontal axis and for adjusting the gun about a vertical axis at the first gun mount, and an upright retractable pin for hinging the first mount and first gun carried means for such adjustment about a vertical axis and holding both said gun carried means against disengagement from said mounts.

2. A detachable mount for a gun having forward and rearward pairs of laterally extending trunnions, said mount including forward and rearward jaws having substantially parallel opposed faces for receiving the trunnions therebetween to provide for movement of the gun about the axis of the trunnions and also in the plane of said faces, an element pivoted to the gun substantially upon the axis of one of said trunnion pairs and adapted to be received in a recess in the mount, a locking pin slidably supported by the mount for axial movement into and from locking engagement within a bore provided in said element, the pin when in such engagement constituting a pivot about which the gun may be moved in said plane of said faces, and means at the other pair of trunnions for adjusting them vertically and laterally relative to the mount.

3. In an aircraft gun mount for a gun having longitudinally spaced laterally extending pairs of trunnions, a pair of open longitudinally directed hooks on the aircraft with which a first pair of trunnions is engaged, means mounting said hooks on the aircraft for vertical and horizontal adjustment relative to the aircraft; an element pivoted on the axis of the second pair of trunnions having a portion with an opening whose axis is substantially vertical and normal to said second trunnion axis, a pair of longitudinal guides on the aircraft with which said second trunnions are engaged and on which said second trunnions are rockable during vertical adjustment of the hook mounting on said aircraft, said element also being rockable on the second trunnion axis during such adjustment, and a retractable pin movable on a vertical axis on the aircraft engageable with the opening in said pivoted element portion to secure said gun and trunnions from longitudinal movement in said guides and hooks and providing a vertical pivot about which the gun may swing when lateral adjustments are effected at said hook mounting.

SHELDON M. MILLER.

REFERENCES CITED

The following references are of record in the file of this patent:

UNITED STATES PATENTS

| Number | Name | Date |
|---|---|---|
| 1,385,755 | Roche | July 26, 1921 |
| 1,939,699 | Hofstetter | Dec. 19, 1933 |
| 2,076,256 | Swalm et al. | Apr. 6, 1937 |
| 2,172,340 | Mihalyi | Sept. 5, 1939 |
| 2,326,904 | Trimbach | Aug. 17, 1943 |
| 2,364,509 | Bertram et al. | Dec. 5, 1944 |
| 2,371,004 | Unterman | Mar. 6, 1945 |
| 2,385,024 | Palfrey | Sept. 18, 1945 |
| 2,426,498 | Franklin | Aug. 26, 1947 |

FOREIGN PATENTS

| Number | Country | Date |
|---|---|---|
| 457,570 | Great Britain | Dec. 1, 1936 |
| 521,205 | Great Britain | May 15, 1940 |
| 553,296 | Great Britain | May 17, 1943 |